United States Patent [19]
Cronin

[11] Patent Number: 4,523,517
[45] Date of Patent: Jun. 18, 1985

[54] ALL ELECTRIC ENVIRONMENTAL CONTROL SYSTEM FOR ADVANCED TRANSPORT AIRCRAFT

[75] Inventor: Michael J. Cronin, Sherman Oaks, Calif.

[73] Assignee: Lockhead Corporation, Burbank, Calif.

[21] Appl. No.: 494,229

[22] Filed: May 13, 1983

Related U.S. Application Data

[63] Continuation of Ser. No. 183,609, Sep. 2, 1980, abandoned.

[51] Int. Cl.³ ............................................. B64D 13/00
[52] U.S. Cl. ...................................... 98/1.5; 237/2 A; 290/4 C
[58] Field of Search .......................... 237/2 A, 12.3 A; 98/1.5; 165/41, 42, 44; 62/401, 236; 60/39.14, 39.15, 39.33; 290/4 R, 4 A, 4 B, 4 C, 40 R, 40 A, 40 C

[56] References Cited

U.S. PATENT DOCUMENTS

| | | | |
|---|---|---|---|
| 2,485,522 | 10/1949 | Andersen | 98/1.5 |
| 2,697,917 | 12/1954 | Mayer | 98/1.5 X |
| 3,144,317 | 8/1964 | Arnoldi | 98/1.5 X |
| 3,577,902 | 5/1971 | Gardner | 98/1.5 |
| 3,732,751 | 5/1973 | Berman et al. | 290/4 C |

FOREIGN PATENT DOCUMENTS 531482  4/1954  Italy ..................................... 290/4 C

*Primary Examiner*—Henry Bennett
*Attorney, Agent, or Firm*—Louis L. Dachs

[57] ABSTRACT

The invention is an all electric environmental control system. The primary power for the system is provided in a first embodiment by a compressor ($C_1$) driven by an electric motor (14). The system includes the primary heat exchanger (16), an expansion cooling system (20), and a water separator (26). The electric motor (14) may be utilized in another embodiment to drive a compressor (23) within the expansion cooling system (20'). A vapor-cycle cooling system including the freon-compressor (34), the condenser (36) and the evaporator (38) may optionally replace the expansion cooling system (20). To compensate for pressure variations during flight, the electric motor (32) is mounted to a planetary gearbox (44) with a "makeup"/"subtract" differential electric motor (42) such that the compressor ($C_1$) is run at the desired speed. The compressor ($C_1$) is provided with inlet guide vanes (56) which are controlled by the flow meter (52) and flow logic circuit (54) to provide the desired flow rate of air to the environmental control system.

3 Claims, 6 Drawing Figures

ALL ELECTRIC ENVIRONMENTAL CONTROL SYSTEM FOR ADVANCED TRANSPORT AIRCRAFT

This application is a continuation of application Ser. No. 183,609, filed 9/2/80, now abandoned.

TECHNICAL FIELD

The invention relates generally to environmental control systems (ECS) for aircraft and more specifically, is directed to utilizing electric motor-driven compressors to replace engine bleed-air and engine-driven compressors as sources of primary ECS power.

BACKGROUND ART

The environmental control systems, ECS, in current jet-engine powered aircraft, are typically powered by engine bleed-air: that is, air tapped from different stages of the main engine's compressor. Examples of such bleed-air powered ECS for aircraft may be found in U.S. Pat. Nos. 2,777,301 to Kuhn, 2,851,254 to Messinger et al, 3,369,777 to Furlong, and 3,711,044 to Matulich.

In prior art bleed-air systems, the bleed-air serves as a source of hot/pressurized air which is used to power the ECS to accomplish cabin pressurization, cabin heating, cabin-cooling, and cabin-humidity control. Typically, for the ECS, the energy in the bleed air is conditioned by a control system which insures that the cabin pressure is maintained at comfortable atmospheric levels to aircraft altitudes up to 42,000 feet, and that the air supplied to the cabin has acceptable moisture content, temperature, and freshness.

The aforementioned practice of bleeding the engine compressor air has several disadvantages. In extracting this bleed-air, the thermodynamic balance of the engine is adversely affected, with a consequent loss of engine thrust and, even more importantly, with a consequent undesirable fuel-increment penalty. In addition, the engine is typically made mechanically complex by the provisioning of bleed ports at two or more stages of the engine compressor. In the quest for fuel-efficient air-transports, it is essential that the method of extracting power for the ECS be optimized from a power and fuel consumption point of view.

In some special cases, and particularly in the case of earlier piston-engine aircraft, engine-driven compressors were used to power aircraft ECS. These compressors, like the bleed air, serve as a source of hot/pressurized air which is used for the ECS functions enumerated hereinabove. Examples of the use of engine-driven compressors to power aircraft ECS may be found in U.S. Pat. Nos. 2,585,570 to Messinger et al, 2,614,815 to Marchant et al, 2,678,542 to Stanton, and 2,697,917 to Mayer.

While engine-driven compressors eliminate the need for engine bleed for the ECS, they have many inherent disadvantages, including the following, (1) The compressors must be designed to meet the torsional-vibrations and other hostile environments of the engine; (2) The compressors are heavy and demanding of much space/volume; (3) The compressors require mechanical disconnects, to protect the engine drive against mechanical-failures, or seizures of the compressors; (4) Significant ducting must reside in the engine power plant area and must be brought out of the power plant into the aircraft; (5) The transit of the ducting from the power plant, through the pylons, through the wings, etc., impose problems of weight, customized duct-installation, high labor costs, and high material costs; (6) Engine driven compressors do not have viability and flexibility of operation; for example, engine-driven compressors cannot pressurize the airplane without running the engine and cannot be switched off easily, when not required; and (7) Engine-driven compressors require an external air-source, if the (onboard) auxiliary power unit (APU) cannot be run for extended periods of time.

In view of the problems associated with the above prior art approaches, there is a need to develop an efficient, economical, flexible, and energy efficient system for providing power to aircraft ECS.

From the foregoing, it can be seen that it is a primary object of this invention to provide a novel system for providing power for aircraft ECS and thereby eliminate the need for bleeding the engines or using engine-driven compressors. Such a system would then eliminate or lessen to a great extent the several disadvantages discussed hereinabove with relation to the prior art engine bleed and mechanically driven compressor approaches.

A further object of this invention is to provide an "all-electric" ECS for modern advanced transport aircraft (ATA), in which the primary source of energy is derived from one or more electric motor-driven compressors.

DISCLOSURE OF INVENTION

The aircraft ECS of the present invention derives its primary power from at least one electric motor-driven compressor. The electric motor-driven compressor operates in conjunction with either an expansion-cooling system or a vapor-cycle cooling system, and can, if desired, optionally be arranged to drive a compressor within an expansion-cooling system pack.

Variations in air pressure and density as a result of conditions during different flight modes are compensated for by provision of an auxiliary differential drive motor and adjustable compressor-inlet guide vanes. The differential drive motor is controlled by a series of pressure monitoring, logic, and static inverter devices so as to automatically compensate for different flight mode conditions which result in changes in the pressure of the air delivered to the aircraft cabin. Both the differential drive motor and the electric motor are mounted to a differential planetary gearbox which drives the compressor at the appropriate speed. The differential drive motor at any point in time may be inactive, in a makeup mode (adding to the speed of the electric motor), or in a subtracting mode (slowing the speed of the electric motor). The compressor also includes adjustable inlet guide vanes which can be adjusted for desired mass flow in response to data monitored, and signals generated, by known flow meter and flow logic circuit techniques.

The novel features which are believed to be characteristic of the invention, both as to its organization and its method of operation, together with further objects and advantages thereof, will be better understood from the following description, taken in connection with the accompanying drawings, in which presently preferred embodiments of the invention are illustrated by way of example. It is to be expressly understood, however, that the drawings are for purposes of illustration and description only, and are not intended as a definition of the limits of the invention.

BEST MODE OF CARRYING OUT THE INVENTION

In utilizing electric motor-driven compressors in accordance with the present invention, to supply the aircraft ECS with primary power, it should be evident that the electric motors which drive the compressors derive power from electric generators that are driven by the aircraft's engine. To that extent, the ECS of the present invention operates on a form of mechanical power extraction.

Figure 1:
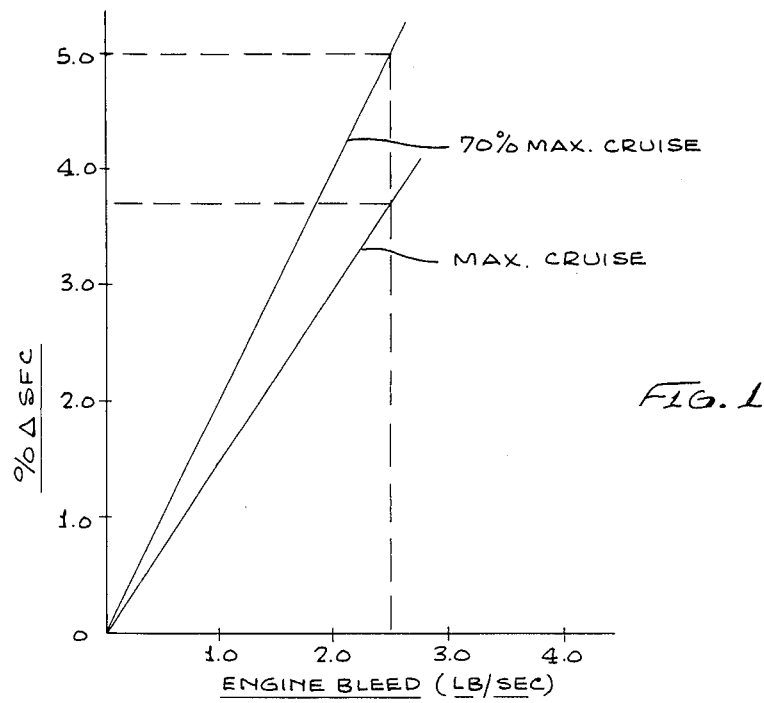
FIG. 1 is a graph showing the relationship between engine bleed power extraction and percentage SFC (specific fuel consumption), for a high compression-ratio/high by-pass-ratio engine.
Figure 2:
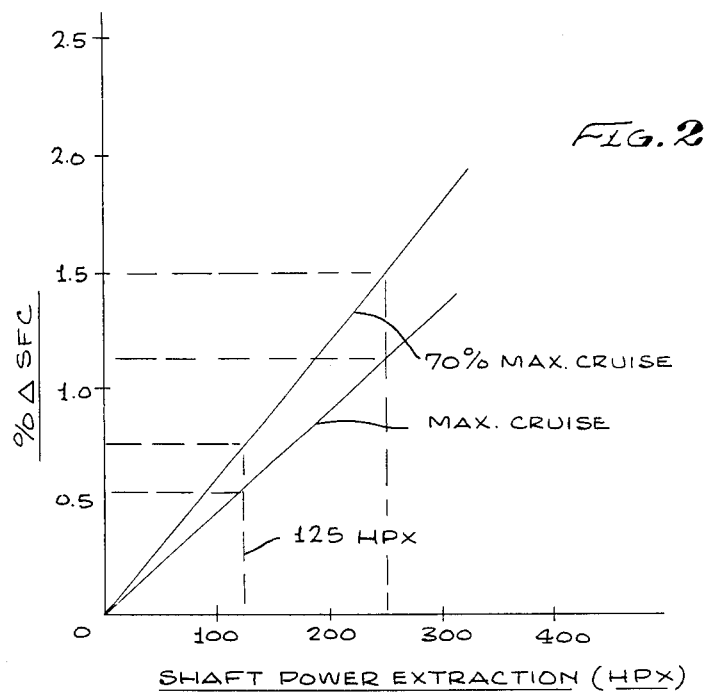
FIG. 2 is a graph showing the relationship between shaft power extraction and percentage $\Delta$SFC for the same engine and conditions as those of FIG. 1.

While it is a fact that this mechanical-power extraction, imposed by the generators, also results in a "thrust-loss" and a "positive change in specific fuel-consumption" ($+\Delta$SFC), reference to FIG. 1 shows that in general, for roughly equivalent power derived, mechanical power-extraction fuel-penalties are typically much less than bleed-air extraction penalties. The curves of FIGS. 1 and 2 relate to a proposed high-compression ratio/high by-pass ratio engine when the airplane is flying at an altitude of 35,000 feet at a typical mach number of 0.8 (for example 600 mph). FIG. 1 shows that a nominal bleed of 2.5 pps (lb/sec) at maximum cruise results in a $+\Delta$SFC penalty of approximately 3.7%. FIG. 2 shows that a 250 hp mechanical extraction at maximum cruise results in a $+\Delta$SFC of only approximately 1.1%. The tabulation below shows the differences in thrust-losses for the same engine.

| Power Extraction Method | Thrust Loss (−Fm) |
| --- | --- |
| Bleed | 3.4%/pps extracted |
| Mechanical | 0.8%/100 hp extracted |

Thus, a 2.5 pps bleed on the engine would cause a thrust reduction of 3.4%/pps$\times$2.5 pps=8.5% thrust loss. If the total engine-thrust at 35,000 feet/0.8M condition were 25,000 pounds, a thrust loss of $$25,000\times 0.085\% = 2,125 \text{ pounds/engine}$$

would be realized.

In contrast, a 250 hp power extraction would result in a thrust loss of $$25,000\times 0.008\% \times 2.5 = 500 \text{ pounds/engine}.$$

While it is somewhat difficult to equate engine bleed and mechanical power extraction methods to one another, it is nevertheless, a fair approximation, to use a 2.5 pps engine bleed and a 250 hp power extraction for purposes of roughly comparing the effect of both types of power extraction, to power aircraft ECS. It should be readily apparent that there are major gains in fuel conservation to be attained by elimination of engine-bleed air and the utilization of mechanically and electrically-driven compressors. Several additional advantages, discussed hereinbelow, are also attainable, over straight mechanically driven compressors, by the utilization of electric motor-driven compressors in accordance with the instant invention. Reference is made to the list hereinabove of seven disadvantages frequently associated with the use of engine-driven compressors.

Figure 3:
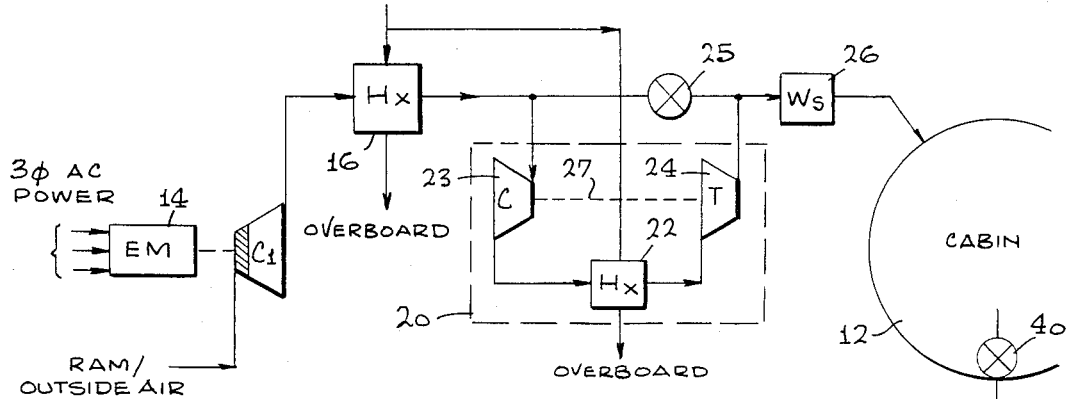
FIG. 3 is a schematic of an electric motor-driven compressor, shown as an integral part of an all-electric ECS in accordance with the present invention.

Referring now to FIG. 3, an electric motor-driven compressor in accordance with the present invention is shown therein forming a part of an all-electric ECS. The compressor ($C_1$) is designed to supply a predetermined weight-flow of air at a certain pressure-ratio to the aircraft cabin (12).

Typically, at an altitude of about 35,000 feet, a pressure ratio of approximately 3.4:1 is required. The air mass-flow is dictated by the number of passengers, and the amount of re-circulated air designed into the system. Generally, normal ventilation-rates are of the order of 1.2 pounds per minute per passenger. Therefore, for a 300 passenger airplane, 360 ppm (6 pounds per second of air) must be delivered to the cabin (12). However, if a 50% re-circulation system is adopted, only 3.0 pounds per second of fresh-air would be required: this would then be the airflow that would size the motor-driven compressors.

Returning to FIG. 3, the compressor ($C_1$) is driven by an electric motor (14), which derives 3 phase AC power from an engine driven generator (not shown). Once the air mass-flow and pressure ratio has been selected, the motor design is optimized for the cruise-altitude condition, which is typically the long duration period, in terms of time. Consequently other flight phases, such as idle-descent let-down, etc., are treated as "off-design" points: maximum efficiency may not be achieved under these conditions, but these phases are of much shorter time-duration, so the fuel penalty is of lesser consequence. As the discharge from the output of the compressor ($C_1$) is hot pressurized-air, it must be fed into the "conditioning phase" of the ECS. This means that the air, if too hot, must be reduced in temperature; the right degree of moisture-content must be provided; and an adequate quantity of fresh air must be supplied.

In FIG. 3, a primary heat-exchanger (16) extracts some of the heat of compression generated by the compressor ($C_1$), after which it may be further reduced in temperature by an expansion-cooling system pack (20). The expansion-cooling system pack (20) includes the compressor (23), the turbine (24), both mounted on the shaft (27), and the secondary heat exchanger (22). In the ECS pack (20), the air is raised to a higher pressure by the compressor (23), and is then expanded by the turbine (24) after it passes through the secondary heat exchanger (22). In the turbine expansion phase, heat-energy is exchanged for mechanical-energy: therefore the turbine "drives" the compressor (23). The expansion cooling system (20), often referred to as a "bootstrap" air cycle system, may be optionally bypassed by operation of the bypass valve (25). In either case, the air is delivered to the cabin (12) from the water separator (26), which conditions the air in known fashion, to have the desired moisture content.

Figure 4:
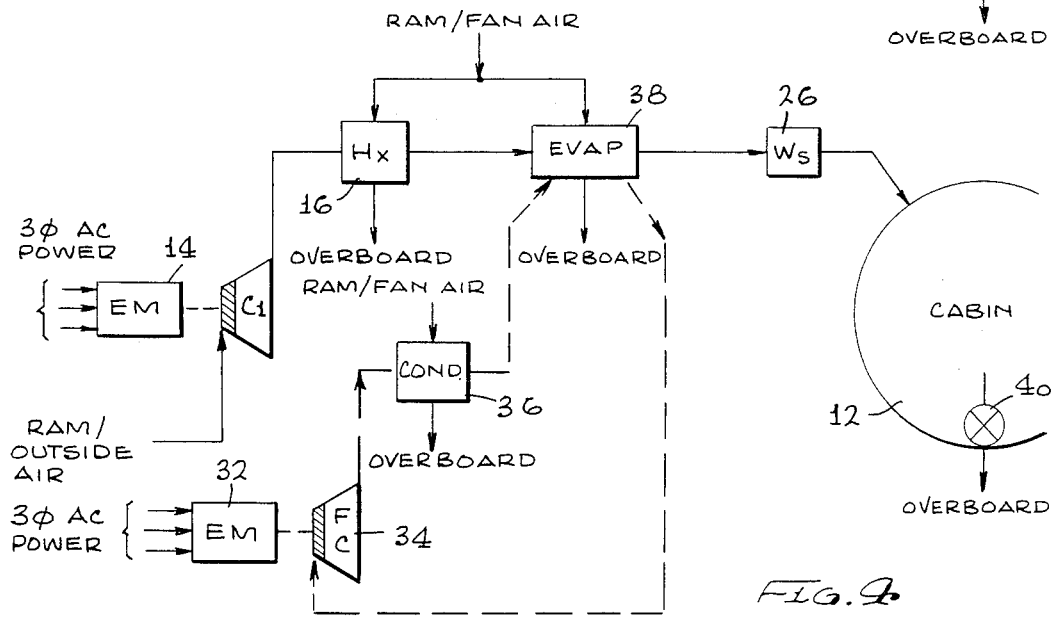
FIG. 4 is a schematic similar to FIG. 3, of an electric motor-driven compressor utilized with an all-electric ECS and having a "vapor-cycle" cooling capability.

FIG. 4 shows an alternative cooling method to the expansion cooling system (20). In this system, frequently referred to as "vapor-cycle" cooling system, the vaporization of freon is used to extract heat from the air. The electric motor (32) drives the freon-compressor (34), which delivers freon at a high-pressure and high-temperature to the air-cooled condenser (36), where it is condensed to a liquid: this freon liquid then changes to a liquid/gas when it passes through an expansion-valve on its way through the evaporator (38). The evaporator (38) is, in effect, another heat-exchanger, in which heat is extracted from the air, (on its way to the cabin) by vaporization of the freon: the amount of heat, extracted from the freon, depends on its latent-heat of vaporization. In either cooling method, the cooling machinery can be bypassed by the by pass valve (25), if conditions dictate the need for warmer air rather than cold air.

FIGS. 3 and 4 are thus illustrative of the role of the electric motor-driven compressor as an integral element of aircraft-air-conditioning systems. It will be recognized by those versed in the art, that no detail is given in the schematics of FIGS. 3 and 4 to temperature, pressurization, mass-flow humidification-control etc. Consequently, known check-valves, flow-control valves, ground-cooling fans, temperature/pressure sensors, etc., and their operation, within the ECS, are not shown. The primary intent and purpose of the present invention is to define the role of an electric motor-driven compressor, as an effective and highly desirable alternative energy source to bleed air and engine-driven compressors.

It is of note that in the past, 100% fresh-air has been furnished to the cabin. More recently, because of the present fuel-inefficiency problems, modern aircraft now frequently utilize, to some extent, air re-circulation. This results in a fuel-saving, even in a bleed-powered ECS. However, electric motor-driven compressors in accordance with the instant invention, can actually eliminate the bleed completely (if other bleed power services are also operated electrically). It is of pertinence also, that the use of say a 50% recirculation system, would reduce the capacity of the motor-driven compressor by 50%. In addition, depending on the degree of controlled and uncontrolled cabin leakage, a good percentage of the cabin air is frequently wasted and dumped overboard by the overflow-valves (40), which modulate to control the cabin pressure to an altitude of approximately 6000 feet. A system for utilizing this normally wasted overboard air is disclosed in copending U.S. patent application U.S. Ser. No. 183,499, filed Sept. 2, 1980, for "ECS Recovery System For Fuel-Energy Efficient Aircraft", and assigned to the assignee herein.

The electric motor-driven compressors of the present invention must meet the difficult demands made on them when there are changes in engine-speeds, atmospheric-pressure, and air-density (as the airplane operates through its flight-envelope). However, while the electric motor-driven compressor of the present invention is affected by these diverse atmospheric-changes, it does not have more flexibility and capability to meet complex ECS requirements, as compared to other non-electric systems.

There are circumstances, however, when such a system requires adjustments to be made. For example, if the motor runs at a speed proportional-to-engine-speed (as it would do if it were driven by a variable-frequency generator), then at the take-off and climb conditions the compressor would be running at maximum speed, with the outside air at its maximum density. This could result in an overloading of the compressor, and an unfavorable sizing criterion on the motor. (Reference is made to copending U.S. patent application U.S. Ser. No. 173,111, filed July 28, 1980 for Advanced Technology Electric Power Generation: A Partial Power Conversion System, and assigned to the assignee herein, wherein a means for supplying variable-voltage/variable-frequency power to aircraft services is described.)

Even in ECS services and systems driven by constant frequency power it is still a problem to match the flow demand during various flight modes with the output of the ECS compressor(s).

Figure 5:
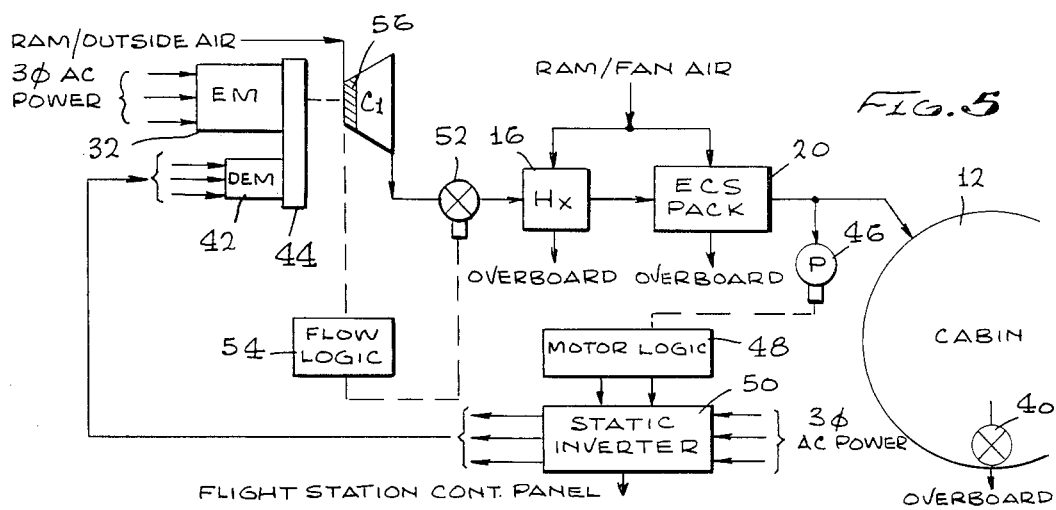
FIG. 5 is a schematic of a control for operating an all electric ECS system in accordance with the present invention.

One approach to solving this problem is depicted in FIG. 5, which shows a "make-up"/"subtract" differential-drive motor (42) arranged to vary the speed of the compressor ($C_1$). The control system of FIG. 5 includes a differential planetary gearbox (44) interposed between the induction type ac motor (32) and the compressor ($C_1$). Mounted to the gearbox (44) is also a speed "make-up"/"subtract" differential electric motor (42), which can perform the following functions: (1) it can maintain constant compressor speed as desired, (2) it can increase compressor speed as necessary, and (3) it can decrease compressor speed as necessary.

During various flight modes, the pressure sensor (46), such as, for example, a pressure transducer type sensor, senses and provides pressure data to the motor logic circuit (48). When the pressure deviates from desired levels, the motor logic circuit (48) triggers the static inverter (50) to program the appropriate voltage and frequency into the differential-drive motor (42), to either speed up or slow down the compressor ($C_1$) via the intermediate planetary gearbox (44). This compressor speed control system thus utilizes known technology of static power inverters which respond to transducer type pressure monitors, that is, varying the voltage/frequency and phase-sequence (direction of phase-rotation) of the inverter output in response to transducer signals, to control the speed and direction of the differential electric motor (42).

The flow control valve (52) compensates for flight mode variations in flow rate as a result of variations in air density, atmospheric pressure, and compressor ($C_1$) output. Stated another way, pressure sensor (46), and thus logic circuit (48), inverter (50), and differential-drive motor (42), are unable to control two parameters, viz, pressure and flow rate, simultaneously. Thus, the flow control sensor and actuator (52) and constant flow monitoring logic circuit (54), modulate compressor inlet guide vanes (56) and compensate during flight for variations in mass flow in the ECS.

Under certain conditions, the differential-drive motor (42) may be stationary and lock the ring-gear of the planetary gear-train. Under other conditions, the motor may rotate in a direction, and at a speed, so as to "make-up" any reduced speed of the main motor. This condition could arise at idle-descent let-down, when the main motor-speed may be too slow for the compressor ($C_1$) to continue pressurization of the cabin (12). Conversely, there are conditions, such as at take-off and climb, when the auxiliary motor would probably have to operate in a "subtract" mode, so as to reduce the speed of the compressor (and thereby avoid motor overloading).

Thus, it can be seen that by the use of the differential-drive motor (42), even when variable frequency/variable voltage power is used, the speed of the motor (42) can be efficiently controlled by the pressure/flow demands of the ECS.

Figure 6:
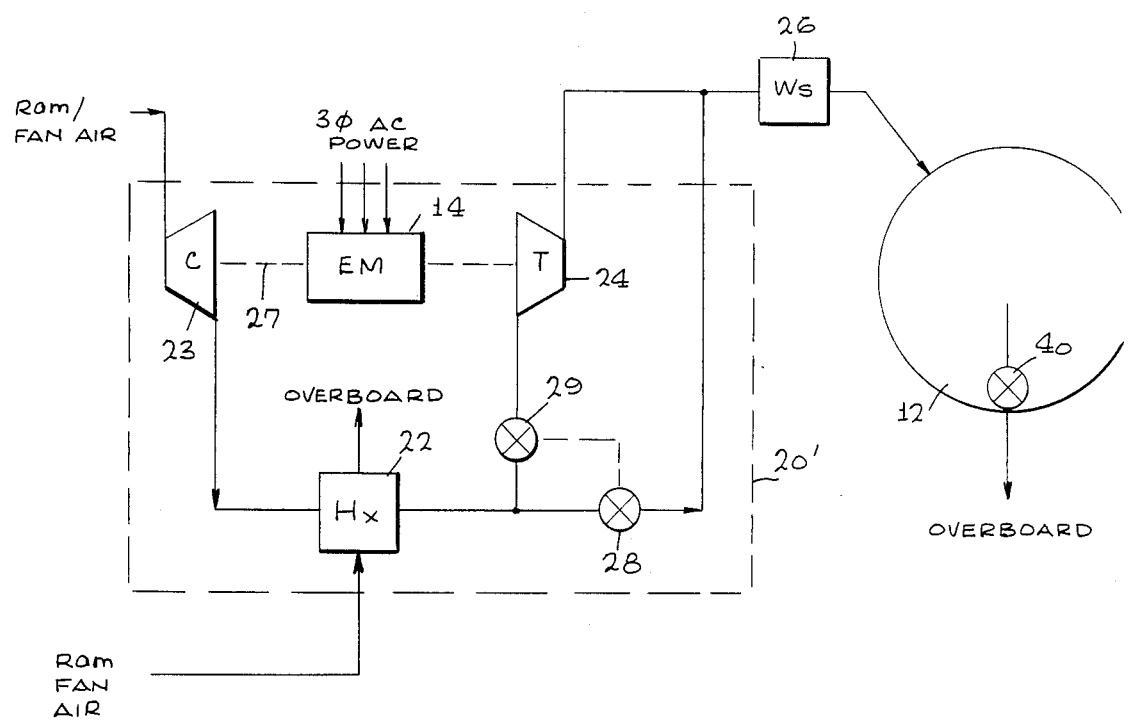
FIG. 6 is a schematic of an electric motor-driven "bootstrap" air cycle ECS in accordance with another embodiment of the present invention. In all drawing figures, like numerals denote like parts.

FIG. 6 is a schematic of an electric motor-driven "bootstrap" air cycle system, and represents an alternative embodiment of operating the air cycle cooling-portion of the FIG. 3 ECS. In this embodiment, the compressor ($C_1$) and the primary heat exchanger (16) have been eliminated, while the electric motor (14) is now mounted to drive the shaft (27) which interconnects the compressor (23) and the turbine (24). Thus, the air cycle (expansion cooling) system (20') represents a modification of the FIG. 3 air cycle system, whereby the electric motor (14) is interposed between the compressor (23) and the turbine (24) on a common shaft. In accordance with this approach, by increasing the pressure ratio of compressor (23), one is able to eliminate the compressor ($C_1$).

Again, in the event that cooling is not desired, operation of the bypass valves (28) and (29) enables the air from the compressor, in this case the compressor (23), to bypass the turbine (24), that is, the expansion cooling system (20') now acts simply as a compressor. Under these conditions, the electric motor (14) would have to develop the full horsepower of the compressor (23), since the backdrive, associated with the turbine (24), would not be present.

While the all electric ECS of the present invention has been described with reference to particular embodiments, it should be understood that such embodiments are merely illustrative, as there are numerous variations and modifications which may be made by those skilled in the art. Thus, the invention is to be construed as being limited only by the spirit and scope of the appended claims.

The aforementioned U.S. patents and patent applications are hereby incorporated by reference herein.

INDUSTRIAL APPLICATIONS

The all electric environmental control systems of the present invention are useful for installation in advanced transport aircraft and are adapted to provide pressurized conditioned air to the aircraft cabin.

I claim:

1. In an aircraft environmental control system for providing a desired amount of conditioned air to the aircraft cabin, said system including at least one compressor for producing a primary supply of high pressure air within said system, the improvement comprising:

an electric motor;

a planetary gearbox;

a "makeup"/"subtract" differential electric motor, said electric motor being arranged to drive said compressor through said planetary gearbox and said differential electric motor being mounted to said planetary gearbox and being adapted to speed up or slow down said compressor in a continuous manner during different segments of the flight of said aircraft, when the pressure of said conditioned air varies from certain preselected desired values; and means for monitoring the pressure of said conditioned air entering said cabin and for sending a signal representative of the monitored value thereof, and further including means for comparing said monitoring pressure value with said preselected desired values and for activating said differential electric motor to speed up or slow down said compressor when said monitored pressure value falls below or exceeds said desired value.

2. An aircraft environmental control system as in claim 1, wherein said differential electric motor is powered from a static inverter whose output voltage, frequency, and direction of phase-rotation are controlled in response to transducers, said transducers being arranged so as to be able to monitor the desired pressure and airflows of said aircraft environmental control system.

3. An environmental control system as in claim 1, wherein said compressor includes inlet guide vanes, said environmental control system including means to monitor the mass flow of air emanating from said compressor and for generating a signal representative of the magnitude thereof, and further including means for comparing said flow value to a desired flow rate and for adjusting said inlet guide vanes in response to variations of said monitored flow value from said desired flow rate.

* * * * *